United States Patent
Kerns et al.

(10) Patent No.: US 6,234,141 B1
(45) Date of Patent: May 22, 2001

(54) METHOD OF CONTROLLING INTAKE MANIFOLD PRESSURE DURING STARTUP OF A DIRECT INJECTION ENGINE

(75) Inventors: James Michael Kerns, Trenton; John Ottavio Michelini, Sterling Heights; Mathew Alan Boesch, Plymouth, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/481,314

(22) Filed: Jan. 11, 2000

(51) Int. Cl.$^7$ ..................................................... F02D 41/06
(52) U.S. Cl. ..................... 123/305; 123/305; 123/491; 123/179.16; 123/179.18
(58) Field of Search .................... 123/305, 295, 123/491, 179.16, 179.18

(56) References Cited

U.S. PATENT DOCUMENTS

| | | |
|---|---|---|
| 3,960,130 | 6/1976 | Peterson, Jr. . |
| 4,693,222 | 9/1987 | Itou et al. . |
| 4,987,871 | 1/1991 | Nishikawa . |
| 5,322,044 * | 6/1994 | Maebashi ............................. 123/491 |
| 5,676,101 | 10/1997 | Kawai et al. . |
| 5,704,324 | 1/1998 | Ichinose et al. . |
| 5,718,203 | 2/1998 | Shimada et al. . |
| 5,732,675 | 3/1998 | Yoshida et al. . |
| 5,735,241 * | 4/1998 | Matsuura ............................. 123/305 |
| 5,806,497 | 9/1998 | Hosoya . |
| 5,873,344 | 2/1999 | Kudou et al. . |
| 5,894,828 | 4/1999 | Sivashankar et al. . |
| 5,910,096 | 6/1999 | Hepburn et al. . |
| 5,947,078 * | 9/1999 | Fujiwara ............................. 123/295 |
| 5,970,955 * | 10/1999 | Nakada ................................ 123/305 |
| 6,050,232 * | 4/2000 | Grob et al. ...................... 123/179.16 |

* cited by examiner

Primary Examiner—Erick Solis
(74) Attorney, Agent, or Firm—John D. Russell

(57) ABSTRACT

A method of controlling intake manifold pressure during startup of a direct injection engine permits a decrease in instantaneous cylinder pressure by reducing intake manifold pressure thereby increasing the time available for fuel injection during the compression stroke, which allows sufficient fuel to be injected at the lower fuel pressures present during starting of this engine.

13 Claims, 2 Drawing Sheets

METHOD OF CONTROLLING INTAKE MANIFOLD PRESSURE DURING STARTUP OF A DIRECT INJECTION ENGINE

TECHNICAL FIELD

This invention relates to engine control systems and, more particularly, to a method of controlling intake manifold pressure during startup of a direct injection engine.

BACKGROUND OF THE INVENTION

Direct injection engines nominally operate at a higher fuel pressure (typically 5–12 Mpa) than other gasoline engines and the fuel injectors are accordingly sized for this higher pressure. When a direct injection engine is started, the fuel pressure is below the nominal value, and the pressure is limited to that supplied by a low pressure (typically electric) pump. Since the fuel pressure during engine starting is initially so much lower than the pressure available from the mechanical pump used for normal operation, long injector pulse widths are necessary to deliver the required fuel mass. Also, since the fuel is injected directly into the cylinder, the injection must be complete before the increasing cylinder pressure on the compression stroke exceeds the pressure in the fuel supply.

In typical engine control systems, an air bypass valve or electronic throttle is usually opened to a position that will allow sufficient air flow to quickly increase torque and allow the engine to reach an initial target high idle speed. This airflow helps maintain a higher intake manifold pressure during cranking and the initial start and allows the engine speed to rise rapidly once combustion is started. However, for the direct injection engine, a higher pressure in the manifold results in higher pressure in the cylinder and a smaller fraction of the compression stroke being available for fuel injection. Also, as the engine speed increases, the time available for fuel injection during any given portion of an engine cycle (typically the intake stroke and the first part of the compression stoke) is reduced. On the other hand, targeting a lower intake manifold pressure results in a smaller cylinder air charge, thereby requiring a correspondingly smaller mass of fuel to be injected at a given air/fuel ratio.

SUMMARY OF THE INVENTION

In accordance with the present invention the air flow into the intake manifold is limited so that the manifold air pressure is reduced during engine cranking and starting. Once the engine is started, the air flow is limited to the amount which gives stable combustion until sufficient fuel pressure is available to allow the fuel mass to be injected with a pulse width that conforms to the reduced time available at the higher engine speeds. The present invention calculates the maximum fuel flow based on fuel pressure and the injector characteristics. The engine combustion process has a "lean" air/fuel ratio limit which is scheduled as a function of engine coolant temperature and engine run time. The maximum air flow limit is determined from the maximum fuel flow and the "lean" air/fuel ratio limit, but may be chosen to be less than this, and the throttle is adjusted to achieve this target.

More particularly, in accordance with the present invention, the air flow in the intake manifold of a direct injection engine, during starting, is limited, based on a desired air/fuel ratio (AFR) and a maximum available fuel flow rate. The desired AFR is less than or equal to the leanest AFR that delivers stable combustion during engine starting conditions. The maximum available fuel flow is based on a determination of the maximum available fuel pulse width, fuel pressure, and engine rotation time period based on engine speed. The fuel pulse width is the time interval between the start and end of injection, the latter of which should occur before the ignition time and before the pressure crossover point where an estimate of cylinder pressure during compression surpasses the fuel injection pressure. The start of injection can be advanced during starting as a function of fuel pressure to maximize the available fuel pulse width. The method of the present invention permits a decrease in instantaneous cylinder pressure by reducing intake manifold pressure thereby increasing the time available for fuel injection during the compression stroke, which allows sufficient fuel to be injected at the lower fuel pressures present during starting of a direct injection engine. Also, this invention will prevent fuel from being injected for particular engine cycles when it is estimated that the limited fuel quantity that could be injected might result in an air/fuel ratio that is likely to cause a misfire.

BRIEF DESCRIPTION OF THE DRAWINGS

A more complete understanding of the present invention may be had from the following detailed description which should be read in conjunction with the drawings in which.

DETAILED DESCRIPTION OF PREFERRED EMBODIMENT

Figure 1:
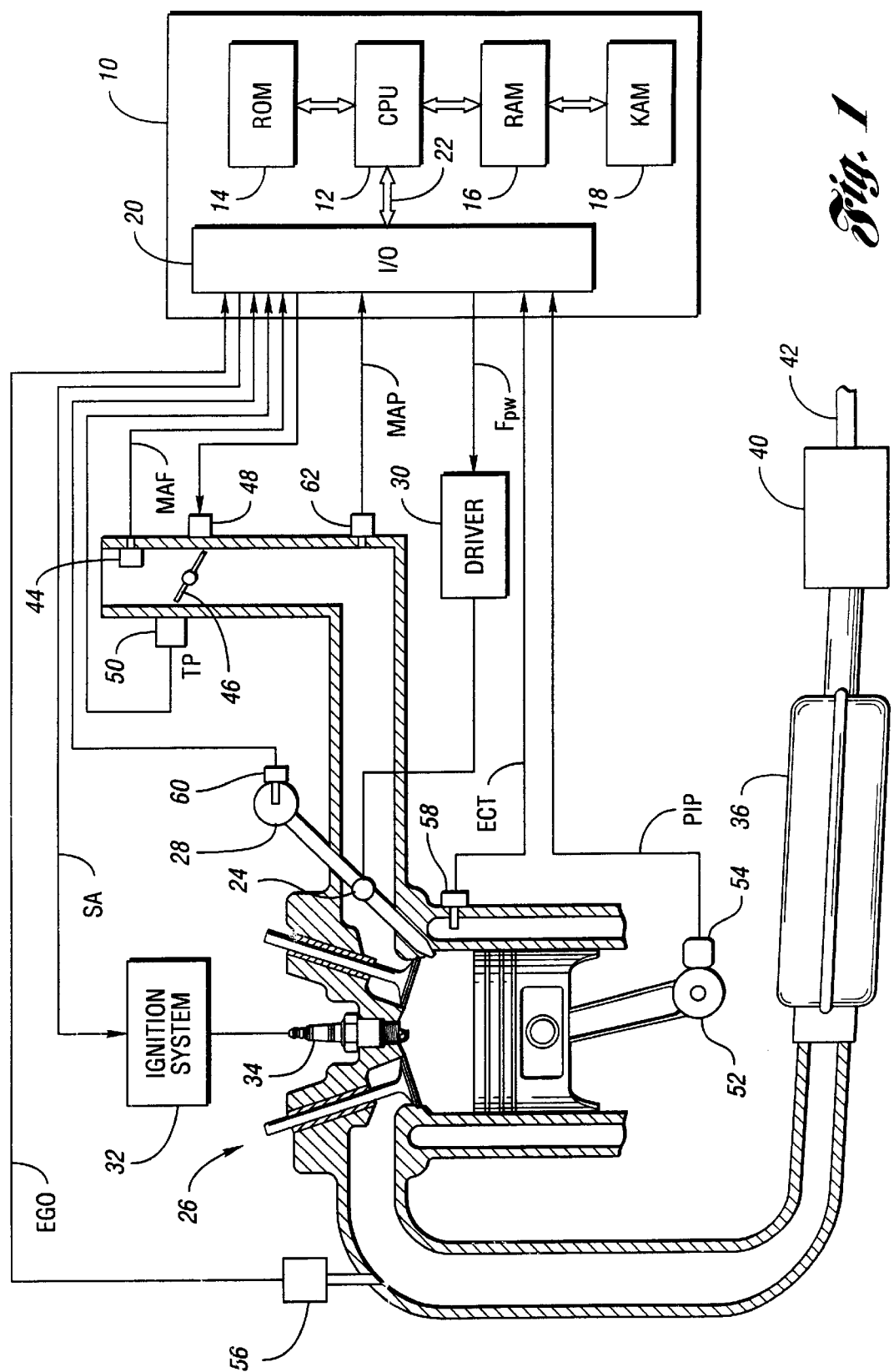
FIG. 1 is a block diagram of the system of the present invention.

Referring now to the drawings, and initially to FIG. 1, a schematic block diagram of an engine control system for carrying out the method of the present invention is shown. An electronic engine controller 10 comprises a microcomputer including a central processor unit (CPU) 12, read-only memory (ROM) 14 for storing control programs, random-access memory (RAM) 16, for temporary data storage which may also be used for counters or timers, such as an Engine Run Timer, and keep-alive memory (KAM) 18 for storing learned values. Data is input and output over I/O ports generally indicated at 62, and communicated internally over a conventional data bus generally indicated at 22.

The controller 10 controls one or more injectors, only one of which is shown and designated 24, which inject fuel respectively into one or more associated cylinders of a direct injection gasoline engine generally designated 26. The fuel injectors are of conventional design and inject fuel into their associated cylinder in precise quantities as determined and controlled by the controller 10. A conventional fuel delivery system including a fuel tank with a fuel pump located therein (not shown) supplies fuel to the fuel injectors by way of a fuel rail 28. The controller 10 is responsive to various engine operating conditions to provide a variable fuel pulse width control signal fpw, by way of a driver 30, to each injector to meet the fuel demand of the engine.

An ignition signal spark angle SA, is provided by the controller 10 to an ignition system 32 to command ignition of a spark plug 34 disposed in each engine cylinder.

An exhaust system transports exhaust gas produced from combustion of an air/fuel mixture in the engine to a conventional close coupled three way catalytic converter (TWC) 36. The converter 36, contains a catalyst material that chemically alters exhaust gas that is produced by the engine to generate a catalyzed exhaust gas. The catalyzed exhaust gas is fed through an exhaust pipe 38 to a downstream muffler 40 and thence to the atmosphere through a tailpipe 42.

An airmeter or air mass flow sensor 44 is positioned in the air intake manifold of the engine and provides a signal to the controller 10 indicative of the air mass flow into the manifold. Controller 10 operates an electronic throttle operator 48, which may comprise a torque motor, stepper motor, or other type of actuating device which throttles the airflow in response to driver demand information from an accelerator pedal position sensor (not shown). Position feedback of a throttle 46 may be provided to controller 10 by a sensor 50.

The crankshaft 52 of the engine 26 is operatively connected with a crank angle detector 54 which detects the rotational speed of the engine. A heated exhaust gas oxygen (HEGO) sensor 56 detects the oxygen content of the exhaust gas generated by the engine, and transmits a signal to the controller 10 to control engine AFR. A sensor 58 provides a signal to the controller 10 indicative of engine coolant temperature (ECT). A fuel pressure sensor 60 located in the fuel rail 28 provides a signal to the controller 10 indicative of fuel pressure. An intake manifold air pressure (MAP) sensor 62 detects the pressure in the manifold 14 and provides a suitable pressure signal to the controller 10. The mass air flow signal from sensor 44, and other data such as the number of cylinders, engine speed, and barometric pressure, may be used by the controller 10 to calculate a cylinder air charge value. Details regarding one method of calculating cylinder air charge may be found in commonly assigned U.S. Patent to Messih et al U.S. Pat. No. 5,331,936, the disclosure of which is incorporated herein by reference.

Figure 2:
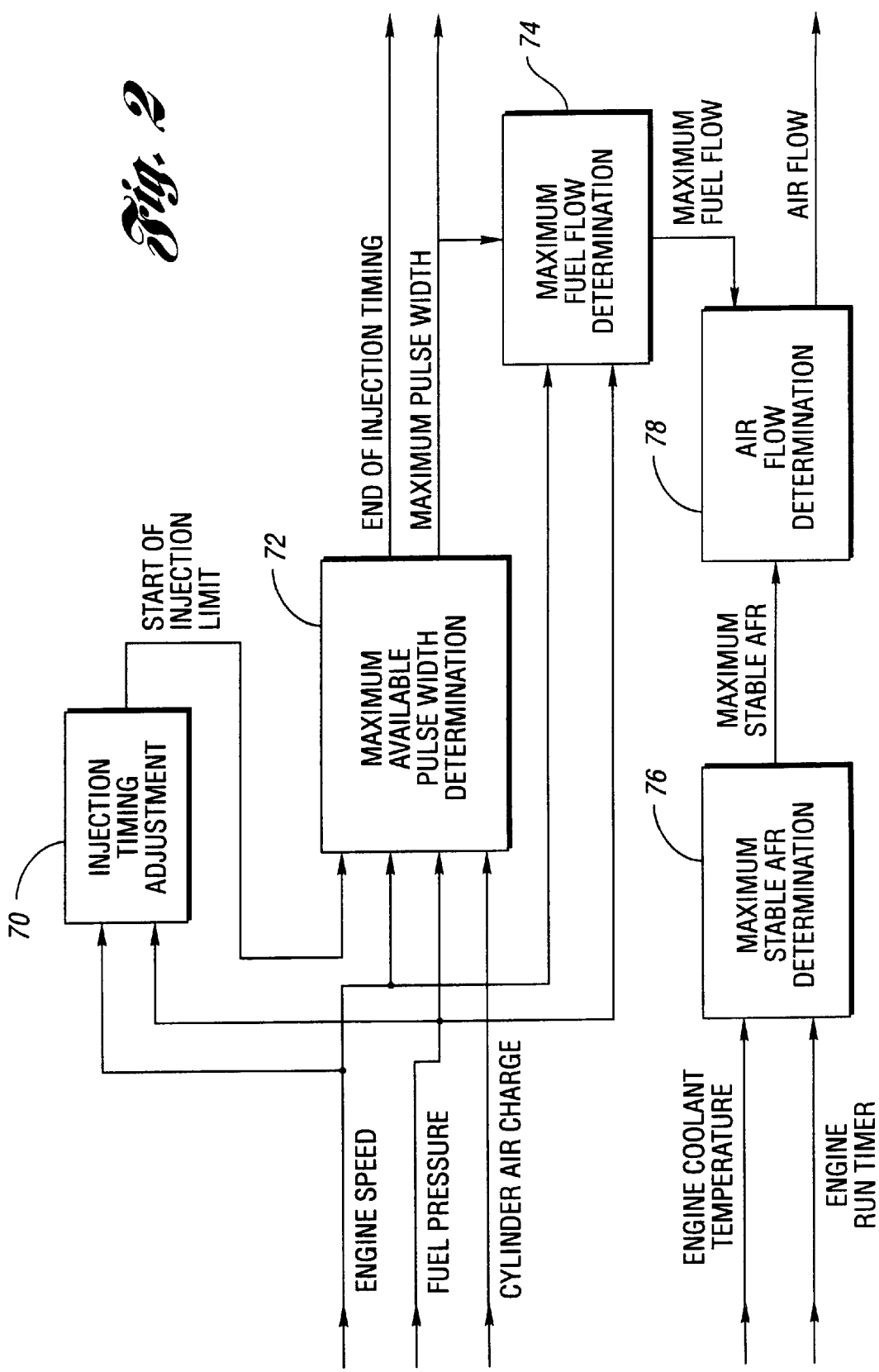
FIG. 2 is a block diagram of the control method of the present invention.

Referring now to FIG. 2, a block diagram of the interaction of software modules controlling the operation of the controller 10 is shown. An injection timing adjustment routine depicted at block 70 determines the earliest acceptable time (i.e., crank angle) to start injecting fuel into a cylinder as a function of engine speed and fuel pressure. The routine advances injection timing at low fuel pressure to allow larger pulse widths. From experimental data a ROM lookup table is calibrated that is employed in this routine to schedule the earliest crank angle which avoids emission and combustion stability problems.

A maximum available pulse width determination routine generally designated 72 determines the end of injection timing (crank angle) or latest possible time to inject fuel and utilizes the start of injection limit or earliest available injection start time, calculated in block 70, to determine the maximum available pulse width. Once the pressure in the cylinder (during the compression stroke) exceeds the pressure in the fuel system, fuel flow will stop, and it is possible to get back flow of air from the cylinder into the injectors which will cause problems during subsequent injections. Also, as the pressure drop across the injector decreases, the flow through the injector is reduced and the quality of the spray (atomization) is reduced. For optimal operation, it is desirable to stop the injection at a predetermined difference between fuel rail and cylinder pressure. Then, given this predetermined delta pressure, and a known fuel pressure, a maximum cylinder pressure can be determined. Based on the mass of the air charge in the cylinder (or the pressure in the intake manifold) and the cylinder geometry the end of injection timing (i.e., crank angle) that corresponds to that maximum cylinder pressure is calculated in block 72. Finally, given the earliest available injection time (crank angle) from block 70, and the calculated end of injection angle the maximum deliverable pulse width (seconds) is calculated by dividing the available angle by the engine rotational speed. Alternatively, rather than calculating the angle, the determination of the end of injection angle as a function of fuel pressure and cylinder air charge mass (or manifold pressure) may be scheduled according to a calibrated lookup table, based on experimental data.

The routine depicted at block 74 predicts the amount of fuel that is delivered for each injection based on the measured fuel pressure and the calculated maximum pulse width by using an empirically derived function or a lookup table. Multiplying the fuel quantity per injection by the number of injections per unit time (a function of engine speed and number of injectors) provides the maximum fuel flow rate. Alternatively, after determining a maximum "on time" (in degrees) from the start and end of injection limits as described above, an injector "on" fraction can be determined by dividing the maximum "on" time by the length of a total engine cycle (720 degrees for a 4 stroke engine, 360 for a 2 stroke engine). Then the injector static flow rate (the flow with the injector on 100% of the time), expressed as a function of the fuel pressure, is multiplied by the injector "on" fraction to obtain the maximum fuel flow under current conditions.

At block 76, a routine determines the maximum stable air/fuel ratio target for engine starting combustion. This target is based on the engine temperature and an estimate of how much the engine has warmed up since it has started and is predicted from an empirically derived function or scheduled according to a lookup table. This estimate of engine warm up may be based on the time elapsed since the engine started such as might be obtained from engine run timer as shown, or from the number of engine revolutions, or from the amount of fuel burned since startup.

Block 78 denotes a routine for determining an air flow limit. This routine involves multiplying the maximum or desired air/fuel ratio from block 76 by the maximum fuel flow from block 74 to determine the maximum air flow that can be tolerated.

The air flow limit at the output of block 78 is provided to software that implements that portion of a conventional powertrain control algorithm for controlling an air flow device such as, for example, the engine throttle. The throttle would be controlled to adjust air flow to a value always less than the maximum air flow limit. However, changes in cylinder air charge in response to changes in the throttle angle are delayed due to manifold filling effects. Therefore, the cylinder air flow may temporarily exceed the desired maximum air flow limit. In this case, the injection of fuel is preferably temporarily suspended. This "cylinder cut out" has the effect of both reducing unburned hydrocarbons that would result from a potential misfire and reducing the rate of change in engine speed to allow the fuel pressure more time to build.

The maximum fuel pulse width and end of injection timing, are used as limits by software implementing that portion of a fuel control algorithm that calculates and schedules the delivery of fuel to the engine. Once the fuel pressure exceeds a minimal predetermined threshold, the operation of the startup method of the present invention is complete.

While the best mode for carrying out the present invention has been described in detail, those familiar with the art to which this invention relates will recognize various alternative designs and embodiments for practicing the invention as defined by the following claims.

What is claimed is:

1. A method of controlling the air flow in the intake manifold of a direct injection engine during starting comprising a sequence of the following steps:
   determining a maximum available fuel pulse width;
   determining a maximum fuel flow based on fuel pressure and said pulse width;
   determining a maximum air/fuel ratio limit and;
   determining a maximum air flow limit from said maximum fuel flow and said maximum air/fuel ratio limit.

2. The method defined in claim 1 wherein said ratio limit is a lean air/fuel ratio.

3. The method defined in claim 1 wherein said fuel pressure is measured.

4. The method defined in claim 1 wherein said ratio limit is related to engine coolant temperature and engine run time.

5. The method defined in claim 1 wherein said ratio limit is the leanest air/fuel ratio that delivers stable combustion during engine starting conditions.

6. The method defined in claim 1 wherein said maximum available fuel flow is based on a maximum available fuel pulse width, fuel pressure, and engine speed.

7. The method defined in claim 6 wherein said pulse width is the time interval between the start and end of injection, and wherein the start of injection is advanced during starting as a function of fuel pressure to maximize the available fuel pulse width.

8. The method defined in claim 7 wherein said end of injection is bounded by a pressure crossover point defined by at least one measured cylinder pressure.

9. The method defined in claim 7 wherein said end of injection is bounded by a pressure crossover point defined by an estimate of cylinder compression pressure exceeding fuel pressure.

10. The method defined in claim 1 comprising the further step of adjusting an air flow control mechanism to avoid exceeding said maximum air flow limit.

11. The method defined in claim 1 comprising the further step of temporarily discontinuing fuel injection to said engine should the estimated air flow into the cylinders exceed the maximum air flow limit.

12. Apparatus for controlling air flow in the intake manifold of a direct injection engine during starting comprising:
    means for advancing the start of fuel injection during starting as a function of fuel pressure to maximize the available fuel injection pulse width;
    means for computing a maximum fuel flow based on fuel pressure, engine speed, and said pulse width;
    means for determining the leanest air/fuel ratio that delivers stable combustion during engine starting conditions;
    means for determining a maximum air flow limit based on said maximum fuel flow and said leanest air/fuel ratio;
    means for adjusting engine throttle angle in a direction to keep input manifold air flow at a value less than said maximum air flow limit; and
    means for temporarily discontinuing fuel injection to said engine should the estimated air flow to the engine exceeds the maximum air flow limit.

13. An article of manufacture comprising:
    a computer storage medium having a computer program encoded therein for causing a computer to control a direct injection engine during starting, said computer program comprising:
       code for determining a maximum available fuel pulse width;
       code for determining a maximum fuel flow based on fuel pressure and said pulse width;
       code for determining a maximum air/fuel ratio limit and;
       code for determining a maximum air flow limit from said maximum fuel flow and said maximum air/fuel ratio limit.

* * * * *